US008452897B1

(12) United States Patent
Fernald et al.

(10) Patent No.: US 8,452,897 B1
(45) Date of Patent: May 28, 2013

(54) METHOD FOR USING A MULTI-MASTER MULTI-SLAVE BUS FOR POWER MANAGEMENT

(75) Inventors: Kenneth W. Fernald, Austin, TX (US); James W. Templeton, Austin, TX (US); John A. Wishneusky, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 1323 days.

(21) Appl. No.: 11/405,294

(22) Filed: Apr. 17, 2006

Related U.S. Application Data

(63) Continuation of application No. 11/198,698, filed on Aug. 5, 2005, now Pat. No. 7,653,757.

(60) Provisional application No. 60/599,369, filed on Aug. 6, 2004.

(51) Int. Cl.
*G06F 3/00* (2006.01)
*G05F 1/40* (2006.01)

(52) U.S. Cl.
USPC ............... 710/3; 323/282; 323/222; 713/340

(58) Field of Classification Search
USPC ........... 323/282, 222; 713/300, 340; 710/120, 710/3
See application file for complete search history.

(56) References Cited

U.S. PATENT DOCUMENTS

| 5,117,430 | A | 5/1992 | Berglund |
| 5,646,509 | A | 7/1997 | Berglund et al. |
| 5,675,480 | A | 10/1997 | Stanford |
| 5,935,252 | A | 8/1999 | Berglund et al. |
| 6,003,139 | A * | 12/1999 | McKenzie ................... 713/300 |
| 6,079,026 | A | 6/2000 | Berglund et al. |
| 6,199,130 | B1 | 3/2001 | Berglund et al. |
| 6,262,900 | B1 | 7/2001 | Suntio |
| 6,396,167 | B1 | 5/2002 | Simburger et al. |
| 6,396,169 | B1 * | 5/2002 | Voegeli et al. ................... 307/52 |

(Continued)

FOREIGN PATENT DOCUMENTS

WO    WO 02/31943 A2    4/2002

OTHER PUBLICATIONS

"The I2C-Bus Specification Version 2.1", Jan. 2000, pp. 1-48.*

(Continued)

*Primary Examiner* — Ernest Unelus
(74) *Attorney, Agent, or Firm* — Meyertons, Hood, Kivlin, Kowert & Goetzel, P.C.; Jeffrey C. Hood

(57) ABSTRACT

In one set of embodiments, a power management system comprises two or more devices, such as POL devices, configured to transmit and receive data over a shared bus, such as an I2C bus, according to the bus protocol of the shared bus. Each device may be configured with at least one respective address register, which may be programmed with an address uniquely identifying the device, and a mask register that may be configured to mask select bits of the respective address register, thereby enabling the device to identify device groups. In one embodiment, one of the devices identifying itself as a master device may distribute information to any of the other devices by transmitting the information, which may include commands and/or data, to itself, in effect targeting the address programmed into its own address register. The devices on the shared bus may be configured to monitor the bus for events, and respond to each event according to the requirements inherent within a transmitted command, thereby performing the necessary tasks to enable power management functions without the need for interconnecting analog signal lines.

59 Claims, 5 Drawing Sheets

U.S. PATENT DOCUMENTS

| | | | |
|---|---|---|---|
| 6,421,259 B1* | 7/2002 | Brooks et al. | 363/84 |
| 6,470,382 B1 | 10/2002 | Wang et al. | |
| 6,754,720 B1* | 6/2004 | Packer | 710/3 |
| 6,788,035 B2 | 9/2004 | Bassett et al. | |
| 6,915,440 B2 | 7/2005 | Berglund et al. | |
| 6,936,999 B2 | 8/2005 | Chapuis | |
| 6,949,916 B2 | 9/2005 | Chapuis | |
| 7,000,125 B2 | 2/2006 | Chapuis et al. | |
| 7,049,798 B2* | 5/2006 | Chapuis et al. | 323/282 |
| 7,080,265 B2* | 7/2006 | Thaker et al. | 713/300 |
| 7,082,488 B2* | 7/2006 | Larson et al. | 710/301 |
| 7,206,944 B2* | 4/2007 | Odaohhara et al. | 713/300 |
| 2003/0070020 A1* | 4/2003 | Kondo et al. | 710/120 |
| 2003/0142513 A1* | 7/2003 | Vinciarelli | 363/17 |
| 2004/0093533 A1 | 5/2004 | Chapuis et al. | |
| 2004/0123164 A1* | 6/2004 | Chapuis et al. | 713/300 |
| 2004/0123167 A1* | 6/2004 | Chapuis | 713/300 |
| 2004/0135560 A1* | 7/2004 | Kernahan et al. | 323/282 |
| 2004/0255070 A1* | 12/2004 | Larson et al. | 710/305 |
| 2006/0172783 A1* | 8/2006 | Leung et al. | 455/572 |

OTHER PUBLICATIONS

Ron Vinsant, John Difiore and Richard Clarke; "Digitally-controlled SMPS extends power system capabilities"; Powerconversion & Intelligent Motion; 1994; pp. 30-37; vol. 20, No. 6.

V. C. H. Nicholas, C. T. Lau, and B. S. Lee; "A Power LAN for ' Telecommunication Power Supply Equipment"; IEEE Conference on Computer, Communication, Control and Power Engineering (TENCON, Region 10); Oct. 1993; pp. 24-27; vol. 3; Beijing.

Jerry G. Williford and James T. Dubose; "30 kVA LF/VLF Power Amplifier Module"; IEEE Military Communications Conference (MILCOM '95); Nov. 1995; pp. 748-751, vol. 2.

R. Sebastian, M. Castro, E. Sancristobal, F. Yeves, J. Peire, and J. Quesada; "Approaching hybrid wind-diesel systems and Controller Area Network"; IEEE 28th Annual Conference of the Industrial Electronics Society; Nov. 2002; pp. 2300-2305, vol. 3.

James P. Earle; "IPMI/IPMB Satellite Controller for Power Supply Applications" (Preliminary Specification);C&D Technologies, Inc.; http://www.cd4power.com/data/apnotes/acan-02.pdf; 92 pages.

James P. Earle; "IPMI/IMPB Satellite Controller Test Procedure" (Application Guide); C&D Technologies, Inc.; www.cdpowerelectronics.net/products/appnotes/acan04.pdf; 12 pages.

"How to Design Battery Charger Applications that Require External Microcontrollers and Related System-Level Issues"; Dallas Semiconductor; www.maxim-ic.com/appnotes.cfm/appnote_number/680; Mar. 15, 2000.; 20 pages.

"APC-3000-R Front End AC-DC Power Shelf"; Advanced Power Conversion PLC (Data Sheet); Nov. 2002; 6 pages.

"Providing a DSP Power Solution from 5-V or 3.3-V Only System"; Texas Instruments; http://focus.ti.com/lit/an/slva069/slva069.pdf; May 1999; 12 pages.

"HDX-600P Hot Swap—600 Watts—1U High"; Switching Power, Inc.; www.switchpwr.com/hdx-600p.pdf; 2 pages.

"HDSX-600P: I$^2$C Serial Bus Interface (for IPMI implementation):"; Switching Power, Inc.; www.switchpwr.com/I2C.pdf; 3 pages.

John M. Hawkins; "Characteristics of automated power system monitoring and management platforms"; Twenty-second International Telecommunications Energy Conference (INTELEC); Sep. 2000; pp. 46-50.

A. Jossen, V. Spath, H. Doring & J. Garche; "Battery Management Systems (BMS) for Increasing Battery Life Time"; The Third International Conference on Telecommunications Energy Special, (TELESCON); May 2000; pp. 81-88; Dresden, Germany.

Tom Lock; "Digitally Controlled Power Systems: How Much Intelligence Is Needed and Where It Should Be"; IEEE; 1998; pp. 345-348.

"SPI—Appnotes: Alarm & Monitoring Signals"; Switching Power Inc.; 2 pages; www.switchpwr.com/alarm_signals.pdf.

"TDA8020HL Dual Smart Card Interface—Objective Specification v4.2—Data Sheet"; Feb. 24, 2001; 22 pages; Philips Semiconductors.

Chrisotphe Chausset; "Application Note—TDA8020HL/C2 Dual Smart Card Interface"; May 20, 2003; 28 pages; Philips Semiconductors.

"Intelligent charge switches for charging circuit applications"; Jul. 2002; 2 pages; Philips Semiconductors; The Netherlands.

"PCF50604 Power Management Unit—2.5G/3G controller for power supply and battery management"; Jul. 2001; 4 pages; Philips Semiconductors; The Netherlands.

John Perzow; "Point-of-load regulation adds flexibility to set-top-box design"; Jun. 27, 2002; pp. 73-80; vol. 47, Part 14; www.ednmag.com.

H. Taylor and L.W. Hruska; "Standard Smart Batteries for Consumer Applications" Proceedings of the Tenth Annual Battery Conference on Applications and Advances; Jan. 1995; p. 183; Long Beach, CA, U.S.A.

"3-V to 6-V Input, 6-A Output Tracking Synchronous Buck PWM Switcher with Integrated FETs (SWIFT™) for Sequencing"; Oct. 2002-Apr. 2005; 21 pages; Texas Instruments Incorporated; http://focus.ti.com/lit/ds/symlink/tps54680.pdf.

"Programmable Four-Channel Step-Down DC/DC Converter"; Texas Instruments Incorporated; 2005; 16 pages; http://focus.ti.com/lit/ds/symlink/tps54900.pdf.

"LNBH21—LNB Supply and Control IC with Step-up Converter and I$^2$C Interface" (Datasheet); Apr. 2004; 20 pages; STMicroelectronics; www.st.com/stonline/products/literature/ds/9890.pdf.

"Smart Battery System Specifications—System Management Bus Specification"; Dec. 11, 1998; 39 pages; SBS Implementers Forum.

"Advanced Configuration and Power-Interface Specification"; Feb. 2, 1999; 397 pages; Intel Microsoft Toshiba.

"The I$^2$C-Bus Specification—Version 2.1"; Jan. 2000; 46 pages; Philips Semiconductors.

"User's Guide Agilent Technologies Series 661xxA MPS Power Modules & Model 6001A MPS Keyboard"; Apr. 2000; 55 pages; Agilent Technologies; Malaysia.

Programming Guide Agilent Technologies Series 661xxA MPS Power Modules; Sep. 1997-Apr. 2000; 116 pages; Agilent Technologies.

M. Castro, R. Sebastian, F. Yeves, J. Peire, J. Urrutia and J. Quesada; "Well-Known Serial Buses for Distributed Control of Backup Power Plants. Rs-485 versus Controller Area Network (CAN) Solutions"; IEEE 28th Annual Conference of the Industrial Electronics Society (IECON 02); Nov. 2002; pp. 2381-2386; vol. 3.

"Six-Channel Power Supply Supervisor and Cascade Sequence Controller" (Preliminary Information Data Sheet); Summit Microelectronics, Inc.; www.summitmicro.com/prod_select/summary/sms66/SMS66DS.pdf; 2003; 26 pages.

"Operating Manual for Internal RS-232 Interface for XT 60 Watt and HPC 300 Watt Series Programmable DC Power Supplies"; 2002; 62 pages; Xantrex Technology Inc.; Burnaby, B.C., Canada.

Paul Birman and Sarkis Nercessian; "Programmable supplies use switch-mode topologies"; Mar. 1995; pp. 33-34; Electronic Products Magazine; Garden City, New York, U.S.A.

A. Akiyama, T. Nakamura, M. Yoshida, T. Kubo, N. Yamamoto and T. Katoh; "KEKB Power Supply Interface Controller Module"; KEK, High Energy Accelerator Research Organization; 4 pages; Japan.

T. T. Nakaura, A. Akiyama, T. Katoh, Ta. Kubo, N. Yamamoto, and M. Yoshida; "Magnet Power Supply Control System in KEKB Accelerators"; International Conference on Accelerator and Large Experimental Physics Control Systems; 1999; pp. 406-408; Trieste, Italy.

"Installation Guide—Agilent Technologies MPS Mainframe Model 66000A"; Apr. 2000; 29 pages; Agilent Technologies; Malaysia.

"Chemistry-Independent Battery Chargers"; Maxim Integrated Products; http://pdfserv.maxim-ic.com/en/ds/MAX1647-MAX1648.pdf; 25 pages.; Sunnyvale, CA, U.S.A.

Office Action of Aug. 20, 2008, in U.S. Appl. No. 11/425,489, 37 pages.

Office Action of Aug. 19, 2008, in U.S. Appl. No. 11/435,629, 31 pages.

Office Action of Mar. 6, 2008, in U.S. Appl. No. 11/356,674, 39 pages.

Office Action of Sep. 20, 2006, in U.S. Appl. No. 10/820,976, 19 pages.

Office Action of Feb. 21, 2007, in U.S. Appl. No. 10/820,976, 12 pages.
Final Office Action of Aug. 14, 2007, in U.S. Appl. No. 10/820,976, 12 pages.
Advisory Action of Oct. 26, 2007, in U.S. Appl. No. 10/820,976, 3 pages.
Examiner's Answer of Mar. 18, 2008, in U.S. Appl. No. 10/820,976, 18 pages.
Office Action of Jun. 17, 2008, in U.S. Appl. No. 10/820,976, 13 pages.
Office Action of Jun. 16, 2008, in U.S. Appl. No. 11/405,293, 20 pages.
Office Action of Nov. 8, 2006, in U.S. Appl. No. 11/198,698, 41 pages.
Final Office Action of May 3, 2007, in U.S. Appl. No. 11/198,698, 36 pages.
Interview Summary of May 31, 2007, in U.S. Appl. No. 11/198,698, 4 pages.
Office Action of Jul. 25, 2007, in U.S. Appl. No. 11/198,698, 32 pages.
Interview Summary of Oct. 31, 2007, in U.S. Appl. No. 11/198,698, 3 pages.
Final Office Action of Dec. 27, 2007, in U.S. Appl. No. 11/198,698, 30 pages.
Advisory Action of Feb. 19, 2008, in U.S. Appl. No. 11/198,698, 3 pages.
Interview Summary of Jul. 14, 2008, in U.S. Appl. No. 11/198,698, 2 pages.
Office Action of Oct. 9, 2007, in U.S. Appl. No. 11/425,489, 35 pages.
Final Office Action of Apr. 4, 2008, in U.S. Appl. No. 11/425,489, 29 pages.

* cited by examiner

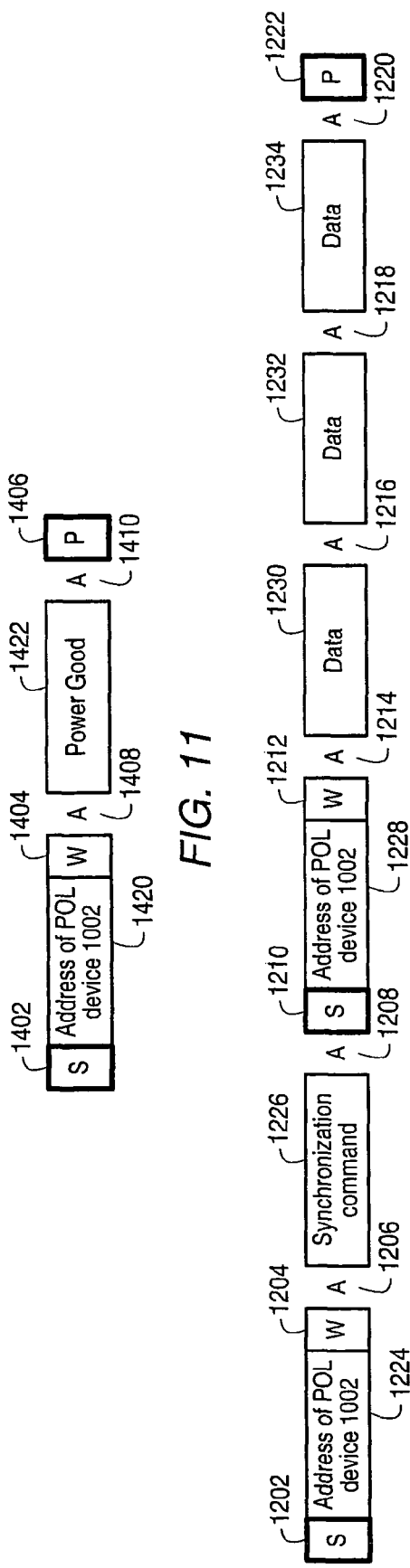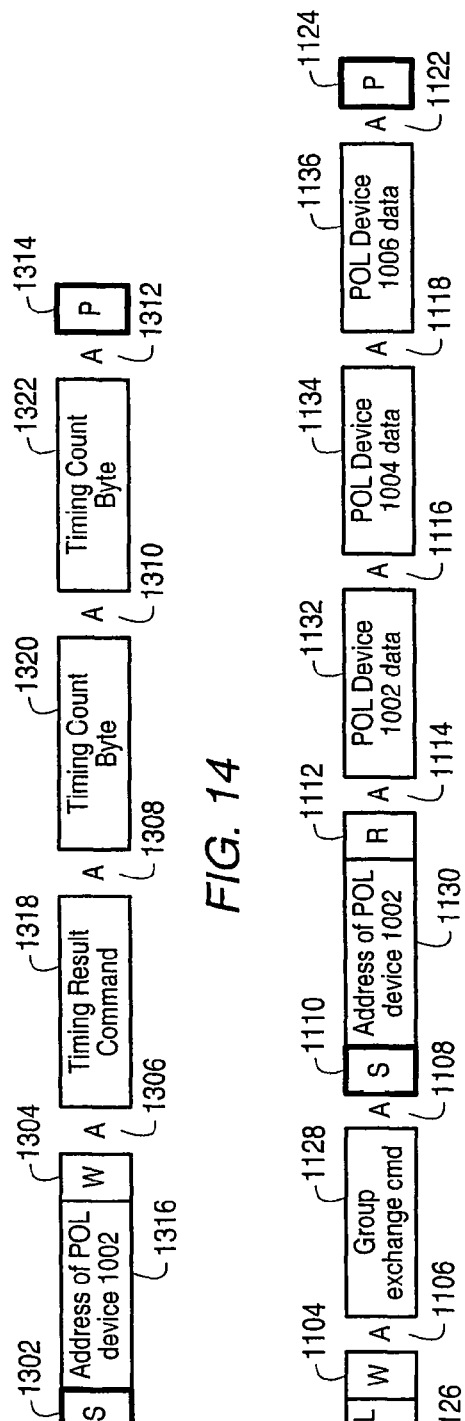

METHOD FOR USING A MULTI-MASTER MULTI-SLAVE BUS FOR POWER MANAGEMENT

CONTINUATION APPLICATION

This application is a continuation of U.S. patent application Ser. No. 11/198,698 filed Aug. 5, 2005 now U.S. Pat. No. 7,653,753 and titled "Method For Using A Multi-Master Multi-Slave Bus For Power Management", whose inventors are Kenneth W. Fernald, James W. Templeton, and John A. Wishneusky, and which claims benefit of priority of U.S. provisional application Ser. No. 60/599,369 titled "Method For Using A Multi-Master Multi-Slave Bus For Power Management" and filed Aug. 6, 2004.

U.S. patent application Ser. No. 11/198,698 and U.S. provisional application Ser. No. 60/599,369 are both hereby incorporated by reference as though fully and completely set forth herein.

BACKGROUND OF THE INVENTION

1. Field of the Invention

This invention relates generally to the field of data communications, and more particularly, to the design of bus interfaces.

2. Description of the Related Art

Power distribution in complex systems is often accomplished by distributing a high-voltage, low-current power source to a set of local direct-current to direct-current (DC-to-DC) converters. These converters, typically known as point-of-load (POL) devices, convert the higher voltage to a level more appropriate for the load or multiple loads that require power. Generally, each POL may be configured to generate a different voltage potential or multiple POLs may be configured to generate the same voltage potential. POLs generating the same voltage potential may be designed to drive separate loads. Similarly, two or more POLs may be connected in parallel to drive one or more common loads.

In systems that utilize multiple POL devices, it is common for the POL devices to exchange information in order to implement necessary power management features. Typical power management features may include voltage tracking, load balancing, sequencing, phase spreading, and clock synchronization. With the rising complexity and robustness requirements of many systems, the ability to monitor and control the power distribution sub-system has become increasingly more critical. Traditionally, information exchanged by POL devices has been represented by analog voltage and/or current signals. There are, however, several advantages to representing the exchanged information as digital data that may be transferred across a bus interconnecting all related POL devices. Monitoring of power distribution sub-systems has typically been implemented via a standard digital interface coupling the major components of the power distribution system to a host microprocessor (oftentimes identified as a Local Controller). The digital interface may allow the Local Controller to continuously monitor the health of the power system. It may also control the power system in order to implement system-level features such as standby and sleep modes.

One digital interface that is particularly well suited for such applications is the I2C (Inter-IC) bus. The I2C bus is a multi-master, multi-slave, two-wire bus that offers support for any device on the bus to access any other device. Transactions on the I2C bus typically consist of a start event, a destination slave address, a read/write bit, and a variable number of data bytes. The transactions are generally terminated by a stop event or another start event. The data byte immediately following the destination slave address may be interpreted as a command or tag byte, which identifies the nature and/or type of the packet.

FIG. 1 shows the basic packet structure of an I2C packet 100, which may contain data to be transferred or written to a slave device. Packet 100 may include a start bit "S" 20 signaling the beginning of the communication from the master. This may be followed by a unique slave address byte "ADR" 22, with the most significant bit (MSB) coming first. The subsequent Read/Write bit 24, typically the eighth bit after "S" 22, specifies whether the slave is to receive (typically a '0' value) or to transmit (typically a '1' value). The Read/Write bit 24 may be followed by an acknowledge bit "A" 26 issued by the receiver, acknowledging receipt of the previous byte. Then the transmitter (slave or master, as indicated by the Read/Write bit) may transmit a data byte 34 starting with the MSB. In the example packet of FIG. 1, the slave is to receive and the first byte following the slave address byte 22 is a command byte "CMD" 34 sent by the master. At the end of the byte, the receiver may issue a new "A" 28. This 9-bit pattern may be repeated until all the required bytes have been transmitted, in this case Data1 36 and Data2 38, and acknowledge bit following each byte. In a write transaction, as illustrated in FIG. 1, when the master is done transmitting, it may monitor the last acknowledge bit, that is, "A" 32, then issue a stop condition "P" 40. In a read transaction (slave transmitting), the master may not acknowledge final byte 38, thereby indicating to the slave that the slave's transmission is completed. The master may then issue "P" 40.

FIG. 2 shows a typical configuration in which multiple POL devices 102, 104, and 106 are coupled together via I2C bus 120 comprising data signal (SDA) line 124 and clock signal (SCA) line 122, which also couples a Local Controller 108 and other devices 110, 112, and 114 that are not directly related POL devices 102, 104, and 106. Each of devices 102, 104, 106, 110, 112, and 114 must be responsive to a unique address, which is its slave address. The slave address may be defined for a device or programmed into a device in several possible ways. For example, the address may be "hard wired" into the device by design. Alternatively, the address may be determined by the connections of one or more pins on a device, with the one or more pins dedicated to selecting the address to which the device will respond. In yet another configuration, the device may contain non-volatile memory into which the slave address as well as other configuration information may be programmed during manufacturing or during a configuration operation performed to prepare the device for use in a particular system or application.

During typical operation, Local Controller 108 may address each POL and/or other device by its unique slave address as required, writing control information and reading status and data. FIG. 3 is a simplified illustration of a packet being transferred from Local Controller 108 to POL device 104. Each of the devices on shared I2C bus 120 may receive the packet sent by Local Controller 108. However, only POL device 104 would recognize the address at the start of the packet as its own. POL device 104 would thus respond to the packet initiated by Local Controller 108, receiving or supplying data as required.

FIG. 4 show the basic bus waveforms on the shared SDA (410 and 412), and SCL (414) bus wires. The bus connections of each device connected to the bus are typically of an "open-drain" nature, with an external pull-up device, generally a resistor or current source (not shown), on each shared signal wire. Each device connected to the bus has the ability to drive the signals to a low or logic 0 level or to not drive it at all. If no device is "pulling" the bus low, the external pull-up typically causes the bus signal to remain at a high or logic 1 level. Also illustrated in FIG. 4 are, a transmission start 402, corresponding for example to "S" 20 in FIG. 1, the MSB through LSB of a slave address byte, corresponding for example to "ADR" 22, and acknowledge 404, corresponding for example to "A" 26, followed by a data byte, corresponding for example to Data2 38, and a stop 406, corresponding for example to "P" 40.

Another bus standard, developed after the I2C bus standard, is the SMBus (System Management Bus), which is backward compatible with the I2C bus standard while introducing additional features to support error detection, hazard recovery, and dynamic address assignment among others. It should be noted that both the I2C bus and the SMBus have predefined means for identifying a slave or destination device, but neither has predefined means for identifying the master or source of a bus transaction. The information transfer requirements of several common power management features will now be presented below.

It is a common requirement that the POL devices in a system enable and disable their power outputs in a predefined order, or sequence. This has commonly been referred to as "sequencing", and is necessary to avoid both temporary and permanent interference with the operation of the system. The sequencing is traditionally accomplished by connecting a "POWER GOOD" (PG) output pin of each POL device to an "ENABLE" (EN) input pin of the next POL device to be enabled. This is illustrated in FIG. 5, where the PG pin of POL device 202 is coupled to the EN pin of POL device 204, while the PG pin of POL device 204 is coupled to the EN pin of POL device 206. Each POL device may assert its PG pin when the output of the POL device has met some predefined condition or reached some predefined state. This event may then allow the next POL device to enable its output followed by asserting its own PG pin.

As an alternative to sequencing, some systems may require that multiple POL devices enable their outputs simultaneously, while also operating to have their outputs maintain a predefined relationship with one another. This has commonly been referred to as "voltage tracking". For example, a given POL device may be required to never allow its output to exceed that of another designated POL device as the POL devices ramp their output voltages. FIG. 6 shows a diagram featuring the respective output voltage 612 of a first POL device, considered the master device, and the respective voltage 614 of a second POL device, considered the slave device, as a function of time. As illustrated, the master device and slave device voltage outputs, 612 and 614, respectively, are enabled simultaneously, with only a nominal delay 616 due to the communication delay that exists between the two devices. As also illustrated, the master device output 612 and the slave device output 614 maintain different values in a predefined manner. Traditionally, the analog output of the master POL device has been connected to an analog input of the slave POL device in order to implement the tracking feature.

In digital implementations of power conversion devices, the output voltage generated during turn-on and turn-off may be controlled by a precision digital-to-analog converter driven by a digital ramp generator. If the oscillator used to drive the ramp generator is precise, and the POL devices are enabled simultaneously, their outputs may ramp together in a predictable fashion. This may provide a means for voltage tracking without the need for additional bus traffic, and is often referred to as "open-loop" voltage tracking (as described in the above paragraph). However, mismatch between the oscillators configured within different POL devices may result in the turn-on and turn-off ramps of the different POL devices to change at different rates, and thereby introduce a mismatch between the POL devices' respective output voltages.

It is often more practical to provide a large amount of supply current to a load by connecting two or more POL devices in parallel, with each POL device intended to provide a roughly equal share of the total load current. Due to possible systematic and/or random mismatches between POL devices, the respective currents provided by different interconnected POL devices may vary considerably. Various methods, such as current balancing and load sharing have typically been used to correct such current mismatches.

Typically, current balancing is accomplished by allowing the POL devices to exchange information about their respective load currents. For example, if a master POL device in the group passes its measured load current to the other POL devices in the group, the other POL devices may adjust their own respective currents such that they match the value of the current they have received from the master POL device. In addition, by virtue of the slave POL devices' outputs being connected in parallel, the master POL device's output must decrease as the slave devices increase their respective output currents, in order to maintain a constant total load current. Other methods may allow for all POL devices to pass their respective measured load currents to other members of the group. In all, the communication between POL devices for maintaining current balance has traditionally been accomplished via one or more shared analog signals.

Additionally, in order to reduce both the input and output voltage ripple, groups of switching regulators, specifically POL devices in this case, are often required to spread their switching times across the switch period such that the respective times at which the POL devices are charging their respective output capacitors (from the input bus) have minimum overlap with one another. This is generally referred to as "phase spreading". Phase spreading has typically been accomplished by configuring each POL device to switch at a set, predefined position within the switching period.

Other corresponding issues related to the prior art will become apparent to one skilled in the art after comparing such prior art with the present invention as described herein.

SUMMARY OF THE INVENTION

In one set of embodiments, a power management system may be configured to allow digital information corresponding to power management functions to be passed between POL devices using a standard multi-master multi-slave interface such as I2C bus interface or SMBus interface. POL devices may report information to multiple other POL devices while maintaining compatibility with non-POL devices also connected to the bus. Power management systems thereby designed to use a common bus to transmit digital information corresponding to power management functions may be configured without the traditional analog connections typically required in systems where multiple power management features need to be implemented.

In one embodiment, as an alternative to the dedicated analog signal connections traditionally used for communication between POL devices, each POL device is configured to generate an event on the shared bus, (such as the I2C bus), in which the POL device generating the event both identifies itself to the other POL devices on the bus, and transmits a command corresponding to one of many possible power management functions. The POL devices on the same bus may be equally configured to monitor the bus for events, and respond to the event according to the requirements inherent within the command, the POL devices thereby performing the necessary tasks to enable power management functions.

In one embodiment, information is distributed to multiple destinations, such as multiple POL devices coupled to the shared bus, by an originating device, which may be one of the POL devices, identifying itself as a master device and effectively transmitting the information to itself. The action of performing a bus write in which a given POL device may send the packet to its own address may both identify the source of the data, and may allow any slave device (e.g. POL devices configured to respond to the address of the master POL device) that needs the data to identify and receive the data from the bus during the transaction. Therefore, in addition to having its own respective assigned bus address, each POL device may be assigned or configured with one or more other addresses or address groups. The additional addresses may define one or more POL device groups, which may enable the specialized group data exchange required by various power management features. The additional address, addresses, or address groups may be used to receive data placed on the bus by a POL device acting as bus master, and to recognize the identity of that bus master POL device. Such configuration or configurations are compatible with normal features of shared buses such as the I2C and System Management Bust (SM-Bus).

In one embodiment, voltage tracking is accomplished by requiring a master POL device to transmit its target or measured output on the shared common digital bus. The slave POL device may receive the data while observing the master POL device transmission, and may use it to control its own output. The master POL device may be configured to both identify itself on the bus, and to transmit its digital output voltage. Therefore, one or more slave POL devices (configured to track the master POL device's output) may recognize the master POL device, monitor the master POL device's transmitted output voltage, and control their own output accordingly.

Current balancing functionality may be implemented by digitizing the load current information for each device and transmitting the resulting digital information across a shared digital bus. In one set of embodiments, the POL devices may also be configured to dynamically adjust their switching times based on information exchanged on the common digital bus. Other power management functions, such as phase spreading, fault recovery, clock synchronization, over-temperature shutdown, and most remaining power management functions may also be accomplished in a similar manner.

BRIEF DESCRIPTION OF THE DRAWINGS

The foregoing, as well as other objects, features, and advantages of this invention may be more completely understood by reference to the following detailed description when read together with the accompanying drawings in which:

FIG. 11 shows one embodiment of a packet structure for a POL device issuing its own respective "power good" event;

FIG. 13 shows one embodiment of a packet structure for a POL device issuing a clock synchronization command;

FIG. 14 shows one embodiment of a packet structure for a POL device reporting its clock synchronization count; and FIG. 15 shows one embodiment of a packet structure for multiple POL devices supplying data in response to a group exchange command.

Figure 1:
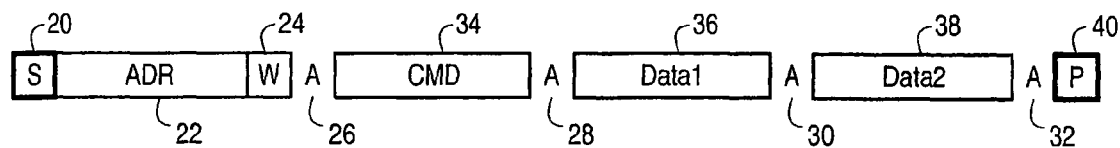
FIG. 1 shows the basic packet structure of an I2C packet according to prior art.
Figure 2:
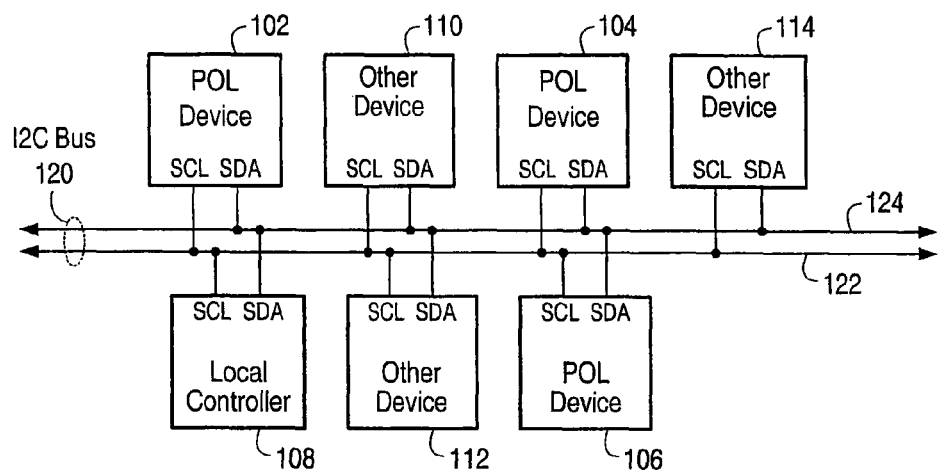
FIG. 2 shows a typical system configuration with POL and non-POL devices and a local controller coupled to an I2C bus, according to prior art.
Figure 3:
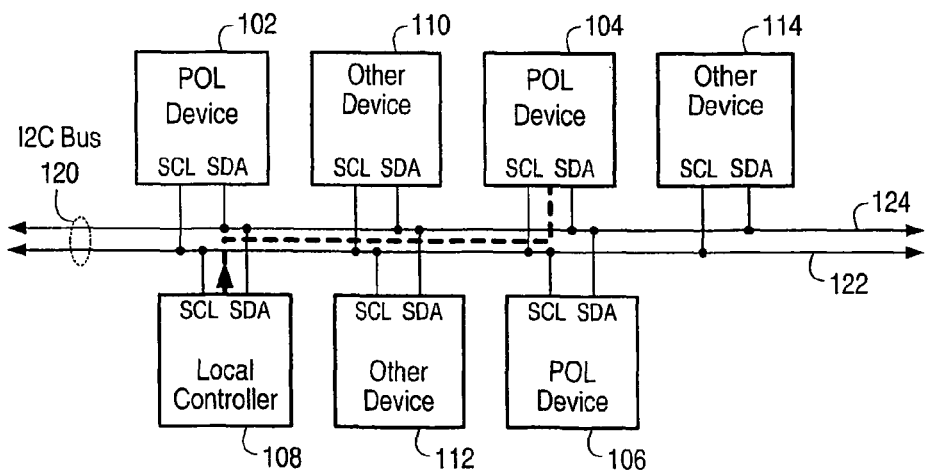
FIG. 3 illustrates a simplified transfer of a packet being from a Local Controller to a POL device, according to prior art.
Figure 4:
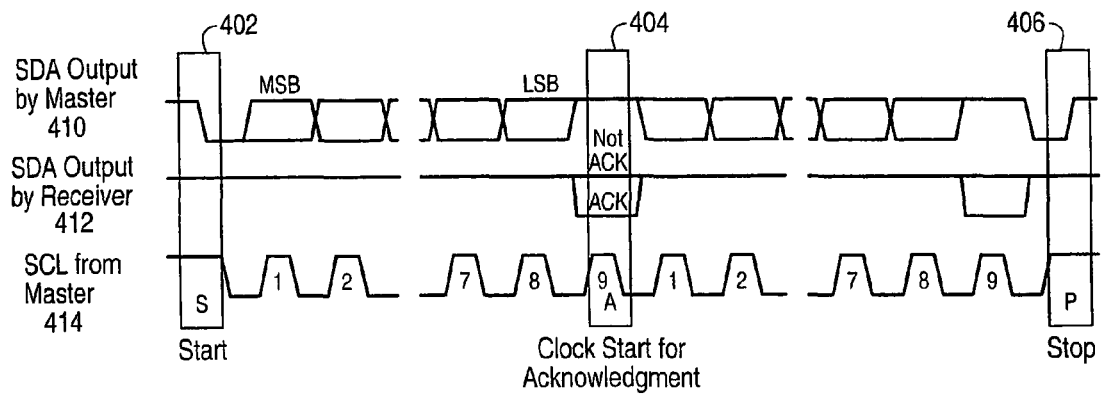
FIG. 4 shows the basic bus waveforms on the shared SDA and SCL bus wires of an I2C bus, according to prior art.
Figure 5:
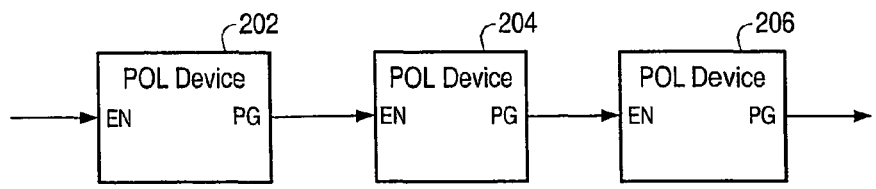
FIG. 5 shows one possible way of linking of POL devices, according to prior art.
Figure 6:
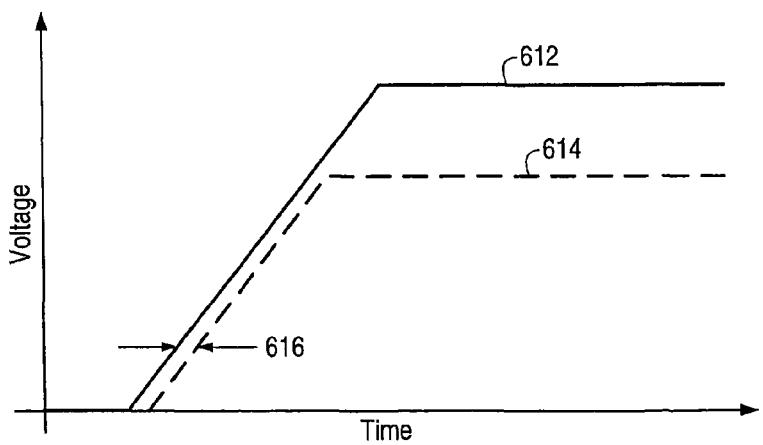
FIG. 6 shows a diagram featuring the respective output voltages of a first POL device, considered the master device, and a second POL device, considered the slave device, as a function of time, according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, a device coupled to a bus that is "uniquely identified by an address" refers to a device identified by an address that is not shared with any other device that is also coupled to the bus. That is, the address that identifies a specified device does not identify any other device. However, more than one address may uniquely identify a single device. For example, a device may be uniquely identified by address '34ef45' and also by address '34ef44', but neither '34ef45' nor '34ef44' may identify any other device. Furthermore, "targeting an address" during a bus operation refers to initiating the bus operation addressing a device uniquely identified by the address. For example, if a first device coupled to the bus has a specified first address that uniquely identifies the first device, and a second device initiates a write operation "targeting the specified first address", then the address information transmitted by the first device as part of initiating the write operation is the specified first address.

In one set of embodiments, a method for using a multi-master multi-slave bus for power management is realized as a broadcast technique, which may be implemented in conjunction with a pre-existing bus protocol, to co-ordinate the behavior of a plurality of devices coupled to the bus that operates according to the pre-existing bus protocol.

In one embodiment, the broadcast technique is configured to facilitate the exchange of information between a plurality of point-of-load (POL) converters or devices in a power management system. The exchanged information may have a single origination point, for example a master POL device during voltage tracking, and multiple destination points, for example slave POL devices during voltage tracking. The information may be exchanged digitally, providing improved noise immunity and reduced system complexity by minimizing the number of signals connected between devices. In one embodiment, in order to maintain a minimum number of interconnected signal lines, the signal exchange may be performed on an existing digital interface within the system.

One set of embodiments may be configured with an Inter-IC (I2C) bus for system level monitoring and control. Typically, the I2C bus and other similar busses do not inherently support transactions that require multiple destinations, and/or transactions for which the originator needs to be identified. Transactions for multiple destinations may be performed on an I2C bus via a general broadcast transaction, but a general broadcast transaction used for performing power management functions may not be compatible with other (non-POL related) devices that are also coupled to the I2C bus. In addition, while the originator of a transaction may be identified through including an identifier data byte in the transaction, such inclusion may come at the cost of additional bus traffic and may therefore lead to higher bandwidth requirements. Furthermore, the inclusion of an identifier byte in the packet may not solve the problem of addressing a selected group of POL devices.

In one embodiment, a multi-master multi-slave bus architecture may be configured to have information identified as having originated from a particular device, and to have the information distributed to multiple destinations by allowing the originating device to effectively transmit the information to itself. For example, a given POL device having address 0x01 may transmit its measured output voltage to other POL devices on the bus by performing a bus write, where the target address for the bus write is the given POL device's own address. The write operation itself may not necessarily occur, given that the POL device may act as the bus master to send the packet, and may therefore not need to respond as a slave to its own address within the packet. The action of performing a bus write in which a given POL device may be sending the packet to its own address may both identify the source of the data (e.g. address 0x01), and may allow any slave device (e.g. POL devices configured to voltage track device 0x01) that needs the data to identify and receive the needed data from the bus during the transaction.

Since in conventional use no two devices are allowed to share a bus address, it is safe for a device to perform a write to its own address without the risk of bus failure or contention. Also, since all devices not associated with power delivery may simply ignore the transaction, this method of transferring information to a set of POL devices would remain compatible with non-power devices. Furthermore, in addition to having its own respective assigned bus address, each POL device may be assigned or configured with one or more other addresses or address groups. The additional addresses may define one or more POL device groups, which may enable the specialized group data exchange required by various power management features. The additional address, addresses, or address groups may be used to receive data placed on the bus by a POL device acting as bus master, and to recognize the identity of that bus master POL device. Such configuration or configurations are compatible with normal features of the I2C and System Management Bust (SMBus), both of which allow for bus arbitration and clock stretching that may be required by master and slave devices. Packets sent to a POL device by the Local Controller may be differentiated from packets that may be transmitted by a master POL device by the value of the command or tag following the address within any given packet. Alternatively, each POL device may be configured with an additional assigned address or addresses, which are uniquely different from the respective address used by the Local Controller to address a given POL device. The additional addresses may be used exclusively for implementing a select set of features, for example power management features, in which case the use of these additional addresses may uniquely distinguish the group communication packets corresponding to that set of features from conventional bus traffic originated by the Local Controller.

Figure 7:
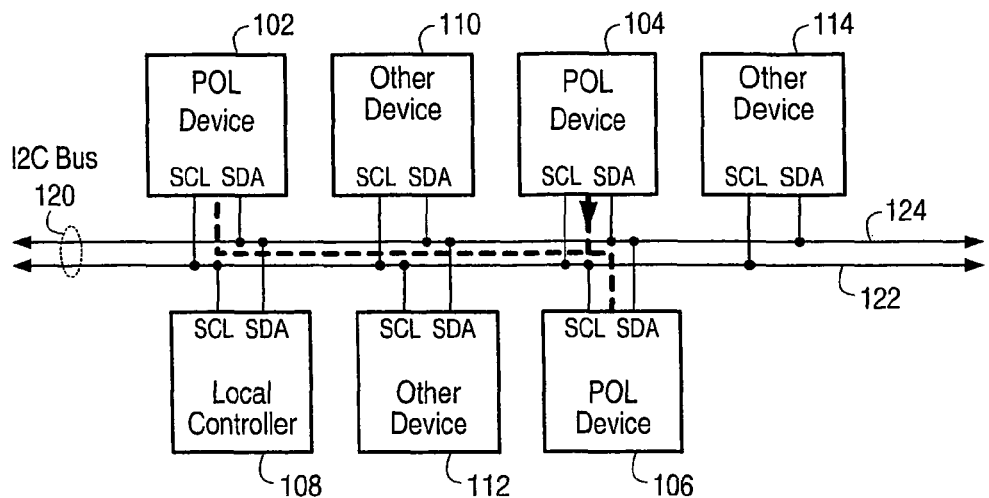
FIG. 7 shows one embodiment of a system configured with POL and non-POL devices and a local controller coupled to an I2C bus, where a transmitting POL device acts as a master POL device during a POL device to POL device transfer.

In one embodiment, each POL device required to transfer information to other POL devices first becomes the bus master and transmits its own address, followed by a transaction tag that identifies the type of transaction. FIG. 7 illustrates an example of a POL device to POL device transfer, where POL device 104 transmits a packet to POL devices 102 and 106. The packet transmitted by POL device 104 may be accessible by all other devices coupled to bus 120, including non-POL devices 110, 112, and 114. However, POL devices 102 and 106 may be the only devices configured to recognize the packet and accept the data from POL device 104. In addition to their own respective addresses, POL devices 102 and 106 may also be assigned the respective address of POL device 104, enabling them to respond to any packet addressed to POL device 104. Thus, when POL device 104 transmits a packet to itself, POL devices 102 and 106 may also recognize that packet.

In one embodiment, POL devices may be configured with an I2C, SMBus, or other shared bus interface in a novel POL controller design. Each POL device may include at least two slave address registers. The slave address registers may support concurrent comparisons with an address contained in a packet transmitted onto the bus. If the address in the packet is a match for either of the slave address register values, the controller may recognize the address and may respond to the packet, receiving data written by the external master if the packet is writing data to the slave device identified by the address, and providing data to the external master if the packet reads data from the slave device identified by the address.

Figure 10:
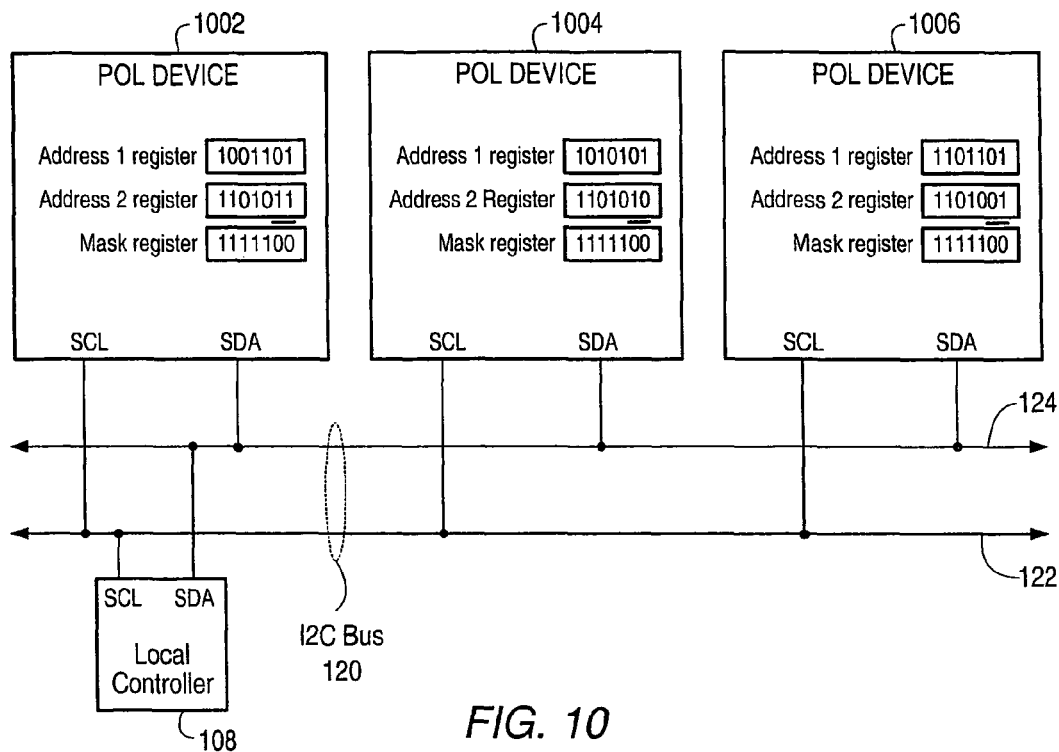
FIG. 10 shows one embodiment of a system configured with POL devices coupled to an I2C bus, where each POL device is configured with multiple address registers.

FIG. 10 shows one embodiment of a group of slave address and mask registers configured in POL devices 1002, 1004, and 1006. Address 1 register may be programmed with a slave address uniquely identifying the POL device in which the Address 1 register has been configured. For example, the Address 1 register in POL device 1002 may be programmed with an address ('1001101' in FIG. 10) that uniquely identifies POL device 1002. POL devices 1004 and 1006 may similarly be identified by the unique addresses programmed in their respective Address 1 registers. The unique respective slave address thus assigned to each respective POL device may be used by Local Controller 108, which may also be coupled to SDA bus 124 and SCL bus 122, when addressing any one or more of POL devices 1002, 1004, and 1006 for status and/or control purposes. It should be noted that while only three POL devices are shown for illustrative purposes in FIG. 10, more or less POL devices may be coupled to I2C bus 120 as required. Alternatively, a shared bus other than I2C may be used, for example an SMBus.

Referring again to FIG. 10, the Address 2 register may be programmed with a second unique respective slave address for POL devices 1002, 1004, and 1006. In one set of embodiments, a respective Mask register may be associated with each Address 2 register. The bits in the Mask register may modify the address recognition function performed with the Address 2 register. For example, bits in the Mask register that are set to logic '1' may identify corresponding bits in the Address 2 register that must match the corresponding bits in the packet address for the address programmed into the Address 2 register to be recognized as a matching address. Bits in the Mask register that are set to logic '0' may identify corresponding bits in the packet address that do not have to match corresponding bits in the Address 2 register for the packet address to be recognized as a match for the address programmed into the Address 2 register. The '0' bits in the mask register may therefore define a group of addresses, all of which may constitute a match for an address programmed into the Address 2 register.

For example, if the 7 address bits in the Address 2 register are '1101011', as shown for POL device 1002 in FIG. 10, and the 7 bits of the Mask register are '1111100', as also shown for POL device 1002, a group of four addresses may be defined. These four addresses may be '1101000', '1101001', '1101010' and '1101011'. The two LSBs may have any value as long as the five MSBs match. The four addresses in the example above may be assigned to individual POL devices 1002, 1004, and 1006, as exemplified by '1101010' being programmed into the Address 2 register of POL device 1004 and '1101001' being programmed into the Address 2 register of POL device 1006. Each of POL devices 1002, 1004, and 1006 in the group may use the address programmed into its respective Address 2 register when sending a broadcast packet to the group, where every other POL device in the group may consequently recognize the address as matching the masked programmed address in its respective Address 2 register, and accept the packet as a group transmission. In addition, the full, unmasked address contained within the packet may uniquely identify which member of the group was the originating device.

It should be noted that the number of bits within an address register and the number of address registers within each POL device were selected for illustrative purposes, and alternative embodiments may be configured with buses featuring packet sizes other than one byte, and may include more or less than two address registers and one mask register, where an address register and/or mask register may be configured with more or less than seven bits.

Example packet tags transfers (such as described above) may include, but may not be limited to, a "power good" event tag, a "power fail" event tag, a measured output voltage tag, a measured load current tag, a fault event tag, or various configuration information tags. For transactions that include data, the tag may be followed by the actual digital data. Power sequencing functionality may be implemented by configuring any given POL device to enable its output, following a transmitting POL device having issued its own respective "power good" event, as illustrated in FIG. 11. The packets shown in FIG. 11 may represent a POL device, for example POL device 1002 from FIG. 10, transmitting a "power good" event tag to the bus, such as I2C bus 120 in FIG. 10. As part of first data byte 1420, POL device 1002 may transmit its own unique address, identifying itself as the originating device, with the "power good" tag following in data byte 1422. Other POL devices that have thus been configured, for example POL devices 1004 and 1006 (also of FIG. 10) may detect the "power good" event on the bus, and may respond accordingly. Similarly, the other configured POL devices 1004 and 1006 may each issue their own respective "power good" transaction on the bus when appropriate.

For voltage tracking, all POL devices configured to track a particular POL device may monitor the bus for the particular POL device's transactions as determined by the particular POL device's address and tag, and may control their own outputs according to the data values retrieved from those transactions. Current sharing and other power management features may also be implemented in similar fashion. In addition, a given POL device's configuration information may similarly be transmitted to other POL devices. For example, each POL device may transmit its programmed target voltage to the other POL devices, allowing the other POL devices to determine if their own respective target voltage is larger or smaller than the transmitted voltage value. The other POL devices may thereby automatically configure themselves to sequence or track according to a prescribed order, such as a "largest output first" order. For example, upon having generated 5V, 3V and 2V outputs, the 5V POL device may detect based on transmitted configuration information that it should enable first, followed by the 3V POL device, then the 2V POL device. A group of POL devices may therefore be configured to automatically sequence according to their respective target voltage levels.

Other power management features including, but not limited to, phase spreading, fault recovery, clock synchronization, and over-temperature shutdown may also be implemented in a similar manner. Phase locking—when a group of POL devices are configured to lock with switching clocks in phase—may also be accomplished in a similar manner by transmitting data or edges on the standard bus.

Figure 8:
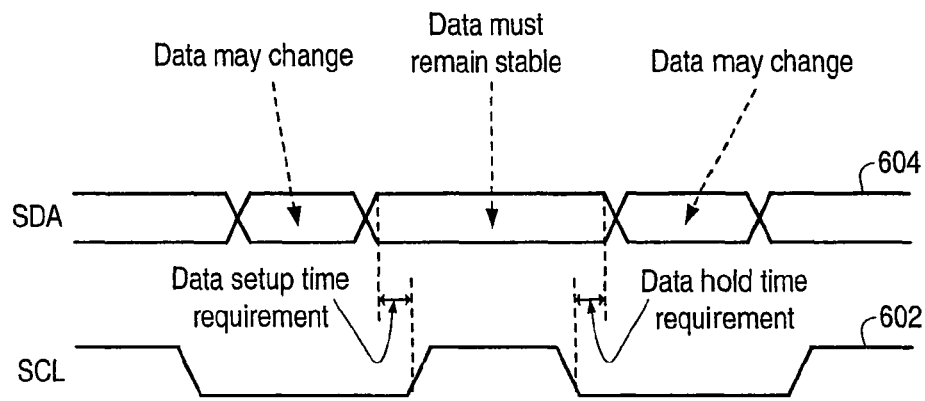
FIG. 8 shows a timing diagram illustrating data setup and hold time requirements for regular data transfer over I2C bus.

In one set of embodiments, high bit-rate data may be transmitted via a low bit-rate standard synchronous bus while maintaining compatibility with existing bus devices. Synchronous bus architectures typically distribute a clock signal and one or more data signals. Each pulse on the clock signal may trigger the transfer of one bit of information on the data signals. In the case of the I2C bus, the data signal SDA 604 may transition to the next bit value to be transmitted after each falling edge of the clock signal SCL 602, as illustrated in FIG. 8. According to the I2C bus standard, data transitions on SDA line 604 may occur only while SCL signal 602 resides in a low state, and the data must remain stable while SCL 602 resides in a high state, as also illustrated in FIG. 8. SDA 604 transitions that occur while SCL 602 resides in a high state may be used to define the "start" condition and "stop" condition for the bus protocol. According to the I2C bus standard, the "start" and "stop" conditions may be generated by the bus master, and are used to start and end transmission of a packet on the bus.

Figure 9:
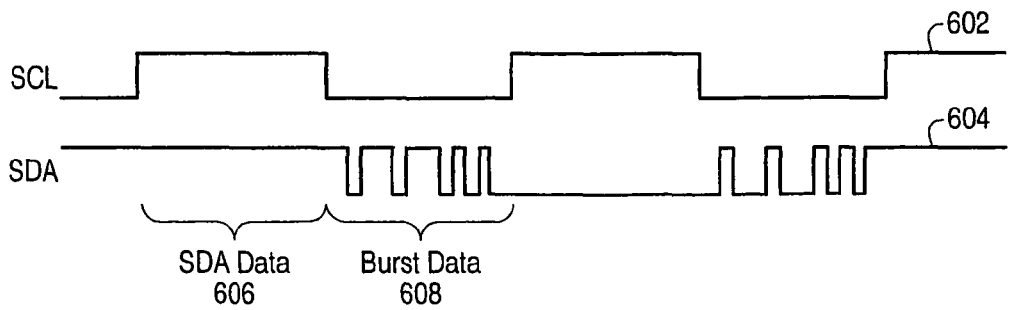
FIG. 9 shows a data burst transfer on the SDA signal bus according to one embodiment.

Standard devices on a bus like the I2C bus are generally configured to ignore transitions on SDA line 604 while SCL signal line 602 resides in a low state. The clock rate typically used in such systems may be relatively low. Furthermore, the I2C specifications and related SMBus specifications include clock stretching capability, that is, where both master and slave devices may be able to extend the time period during which SCL signal 602 resides in a low state. Therefore, data traffic may be embedded on SDA line 604 even while SCL signal 602 resides in a low state. In one embodiment, additional data is transmitted in bursts on the data signal (SDA) while the bus clock (SCL signal) resides in its low state. As illustrated in FIG. 9, SDA data 906 may be stable while SCL signal line 902 resides in a high state, as required by the I2C bus specification, for example. The data transitions of burst data 608 on SDA signal line 904 may be ignored by other devices, as data burst 608 occurs while SLC signal line 902 resides in a low state. In other words, a device may transmit a burst of data on SDA signal line 904, following a falling edge on SCL signal line 902.

The device may be configured to guarantee that the burst has been completed by the next rising edge on SCL signal line 902 by employing the clock stretching capability of the bus, thereby meeting the setup and hold times requirements set forth in the bus specification (and also illustrated in FIG. 8). Legacy devices, that is, devices not configured to operate according to the device-to-device broadcast technique and therefore not able to recognize the data bursts, would operate normally. However, a device designed to receive and interpret the data bursts may use standard clock recovery techniques to decode and use the burst data.

In one set of embodiments, if a device other than the device transmitting data onto the bus is generating transitions on SCL line 902, the device transmitting a burst of data may employ clock stretching to insure that the next transition of SCL signal 902 to a high state does not occur during the burst. If the device transmitting the burst of data is the master device for the packet transmission, it may also control SCL 902 transitions and may insure that the burst of data is completed before the next transition of SCL 902 to a high state. For bus standards featuring a weak pull-up for driving a signal high, the transmitting device may use a strong push-pull driver during the data bursts to achieve higher bit rates. However, in the case of a multi-master bus, the data bursts may need to be inhibited until the transmitting device has acquired the bus.

In one set of embodiments, the bus addresses assigned to the POL devices (for example as shown in FIG. 10) may be used as part of the operational configuration of the POL devices. For example, the numerical order of the respective slave addresses (programmed into each respective Address 2 register in FIG. 10, for example) of a group of POL devices may also be used to establish the sequencing order of the POL devices comprised in the group, that is, the order in which the POL devices are either enabled or disabled. Also, the respective slave address of a POL device may be selected to establish the phase offset the POL device during a switching cycle. In other words, during the configuring of a POL device, the address of the POL device may be chosen such that the device becomes operable to recognize its own place within a switching cycle by examining the address that it has been assigned. For example, by examining its assigned address, a POL device might determine that it is the third in a sequence of four devices. In general, any number of features of a POL device may be configured through bus address assignments.

Figure 12:
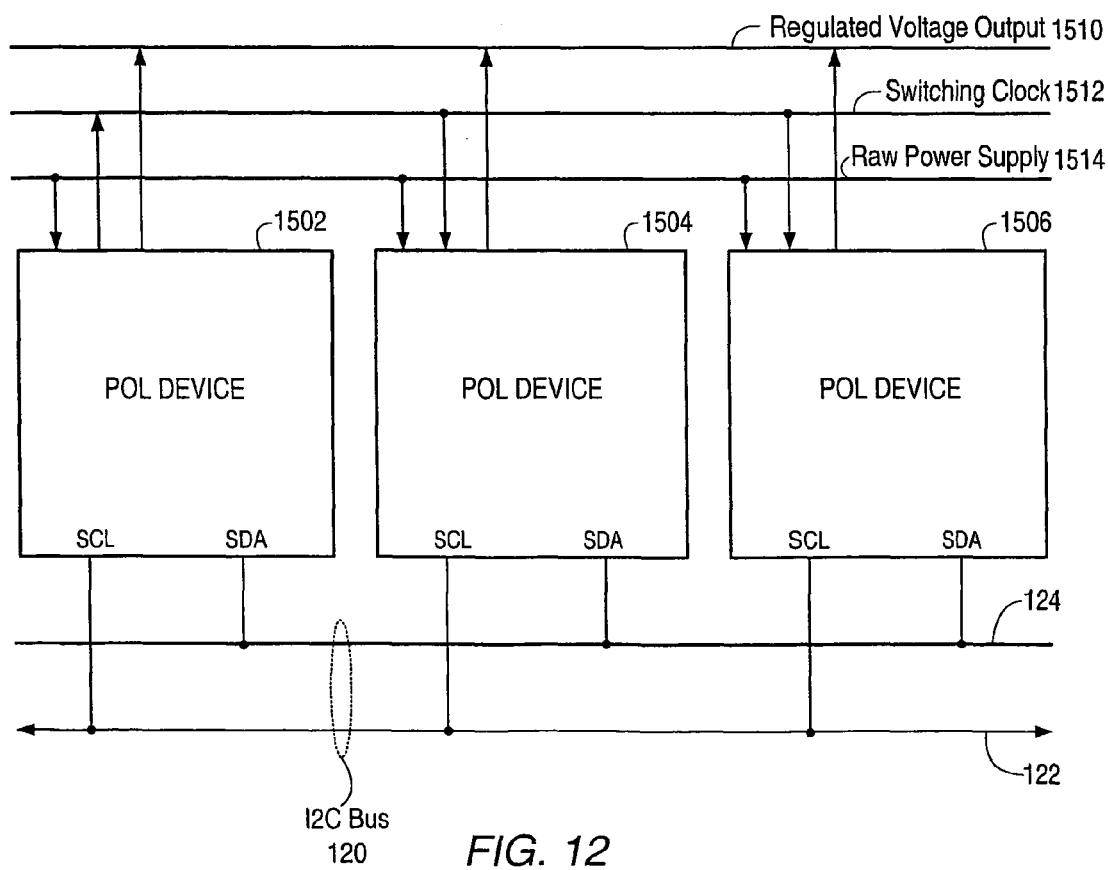
FIG. 12 shows one embodiment of a system configured with POL devices coupled to an I2C bus, with the POL devices driving a common load.

In one embodiment, a common switch clock is used by a group of POL devices that are driving a common load, as illustrated in FIG. 12. In the illustrated embodiment, POL device 1502, by virtue of its address, may recognize itself to be the lead device and output its switching clock which is wired to all the other devices in the group via switching clock line 1512. As shown, POL devices 1504 and 1506 may receive the switching clock signal output by POL device 1502. In order to minimize and/or eliminate conflict among multiple devices trying to drive common switching clock connection 1512, POL devices 1502, 1504, and 1506 may be configured such that only POL device 1502 may recognize itself to be the lead device. Therefore, each POL device may be placed in phase with respect to the common load the POL devices may be controlling via common regulated voltage output line 1510. Each POL device may receive the raw power input from raw power supply 1514. Therefore, each POL device may only require information about the size of the group and its own position within the group for the POL devices to be spread out in phase within the switching cycle. For example, lead POL device 1502 may set its phase adjustment to 0, and POL devices 1504 and 1506 may set their phase adjustment to 120 degrees and 240 degrees, respectively.

In one set of embodiments, POL devices or groups of POL devices that are driving different loads may have independent clocks per each load device. In such embodiments, each POL device may generate its own clock locally, from an internal oscillator. Accordingly, a mismatch between respective oscillators configured in different POL devices may be addressed by calibrating the oscillators against each other, in-system. Referring again to FIG. 10, by way of example, POL device 1002 may be identified as the voltage-tracking master device, and may send a command on bus 120 instructing all POL devices, in this case POL devices 1002, 1004 and 1006, to measure the length of a subsequent transaction on the bus. The packet structure for this command, according to one embodiment, is shown in FIG. 13. In this embodiment, POL device 1002 initiates clock synchronization by transmitting its own address in first byte 1224 and subsequent synchronization command in second byte 1226. The synchronization command may call for all POL devices in the group to measure the duration between "start" 1210 and "stop" 1222 using their own respective oscillators. POL device 1002 may transmit Data bytes 1230, 1232, and 1234 for the purpose of extending the time between "start" 1210 and "stop" 1222 to achieve the desired timing accuracy. In other embodiments, the number of data bytes transmitted by POL device 1002 may be less or more than three.

Following completion of the measurements, the master device, in this case POL device 1002, may send its own measured count to which the slave devices may compare their own respective counts, and determine the relative error between the master device's oscillator and their own respective oscillator. The packet structure for this command, according to one embodiment, is shown in FIG. 14. In this embodiment, POL device 1002 initiates a packet again by transmitting its own address in first byte 1316. In subsequent second byte 1318, POL device 1002 may transmit a timing result command indicating to the other POL devices that POL device 1002 is about to transmit its timing results from the preceding clock synchronization event. Timing count bytes 1320 and 1322 may represent the timing results, which the other POL devices, in this case POL devices 1004 and 1006, may use to calculate corrections to their respective clocks, thereby insuring that there is no timing error between the oscillator of POL device 1002 and the respective oscillators of POL devices 1004 and 1006. Any potential errors may be corrected by each slave POL device (again, in this case POL devices 1004 and 1006) electrically trimming its oscillator frequency, or by the ramp generator correcting the error digitally.

In one set of embodiments, some or all of the POL devices in a POL group may write required data to the bus within a single packet that is initiated by one of the POL devices. Each POL device may have one or more assigned data elements within the single packet or packet type as determined by the tag written by the initiating POL master device. In one embodiment, the assigned addresses of the POL devices determine the order of transmission within the single packet. As shown in FIG. 15, and referencing FIG. 10, POL device 1002, acting as a POL master device, may begin transmission of the single packet by transmitting its address in first byte 1126, indicated as a "write" operation by bit 1104, followed by a "group exchange command" packet tag in second byte 1128. Once the command has been acknowledged (1108), POL device 1002 may retransmit its address in byte 1130, this time indicated as a "read" operation by bit 1112, POL device 1002 thereby requesting members of the group of POL devices to transmit data onto the bus. Each POL device, as determined by its respective address, may in response write its own portion of the data to the bus at the appropriate time as the packet progresses, as illustrated by data bytes 1132, 1134, and 1136, representing data bytes placed on bus 120 by POL devices 1002, 1004, and 1006, respectively. A single "start" bit 1110 and "stop" bit 1124 framing data bytes 1132, 1134, and 1136 is indicative of a single packet.

In one set of embodiments, when configuring various devices, for example POL devices, to communicate with each other as heretofore described, using a pre-existing bus such as an I2C bus or SMBus, only a subset of the pins normally required for a standard implementation of the pre-existing bus may be needed. In other words, proprietary bus functionality embedded in the standard bus protocol of the utilized bus (to provide the required communication capabilities for power management functions) may be accomplished with fewer pins than what a standard bus interface for the utilized bus may require. For example, in case of applications requiring an I2C interface only for implementing POL device communications, a single pin, rather than two I2C pins, may be sufficient for a single-wire bus, to implement the necessary communication capabilities for power management functions on that pin.

It should also be noted that while the above examples presented a bus write as a means for transmitting information from one POL device to another, a bus read may be used in a similar manner to transfer the information. That is, the originating POL device may effectively read from itself. However, other POL devices in its group may need to be configured to recognize the POL master's address without responding to the packet in the same manner in which they would respond to a conventional bus read from the Local Controller. In other words, the POL devices may be required to not supply data in response to the read bit. This mode of operation may involve additional non-standard device behavior, and may introduce additional overhead in the packet by adding a repeated start signal and address to accomplish setting the read bit.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for point of load (POL) converter communication over a serial data bus, the method comprising:
    a first POL converter initiating a bus operation over a serial data bus, wherein the bus operation is addressed to the first POL converter, wherein the first POL converter transmits onto the serial data bus first information that identifies the first POL converter; and
    a second POL converter receiving the first information that identifies the first POL converter and performing a function in response to said receiving the first information that identifies the first POL converter.

2. The method of claim 1, wherein the second POL converter performing a function comprises the second POL converter changing its output voltage.

3. The method of claim 1, wherein the bus operation includes the first POL converter transmitting a value onto the serial bus, wherein the second POL converter performing a function comprises the second POL converter storing the value transmitted by the first POL converter.

4. The method of claim 1, wherein the second POL converter performing a function comprises the second POL converter initiating a second bus operation over the serial data bus.

5. The method of claim 1, wherein the bus operation comprises the first POL converter transmitting data onto the serial data bus; and wherein the method further comprises the second POL converter receiving the data.

6. The method of claim 5, wherein said transmitting data onto the serial data bus is performed during time periods when, according to the bus protocol, data transmitted onto the serial data bus is not required to remain stable.

7. The method of claim 6, wherein said transmitting the data is performed in data bursts.

8. The method of claim 5, further comprising the second POL converter performing one or more power management functions according to the data received from the first POL converter.

9. The method of claim 1, wherein the first POL converter is a master POL converter, wherein the second POL converter is one of a plurality of slave POL converters, wherein the method further comprises at least one of the plurality of slave POL converters responding to the bus operation according to a first portion of the first information.

10. The method of claim 9, further comprising the master POL converter responding to the bus operation according to the first portion of the first information.

11. The method of claim 10, wherein the bus operation is a write operation comprising the master POL converter transmitting additional information onto the serial data bus; the method further comprising one or more of: the at least one of the plurality of slave POL converters receiving the additional information; the at least one of the plurality of slave POL converters transmitting data onto the serial data bus according to the additional information; the at least one of the plurality of slave POL converters performing one or more power management functions according to the additional information; the master POL converter transmitting data onto the serial data bus according to the additional information; and the master POL converter performing one or more power management functions according to the additional information.

12. The method of claim 9, wherein the bus operation is a write operation comprising the master POL converter transmitting master POL power status information onto the serial data bus; the method further comprising: the at least one of the plurality of slave POL converters receiving the master POL power status information; and the at least one of the plurality of slave POL converters transmitting respective slave POL power status information onto the bus.

13. The method of claim 9, wherein the bus operation is a write operation comprising the master POL converter transmitting a synchronization command; the method further comprising: each of a subset of the plurality of slave POL converters receiving the synchronization command; the master POL converter successively transmitting a start event, the first information, synchronization data, and a stop event; each of the subset of the plurality of slave POL converters successively receiving the start event, the specified address, the synchronization data, and the stop event; the master POL converter measuring a transmission time period elapsed between the transmission of the start event and the transmission of the stop event; and each of the subset of the plurality of slave POL converters measuring a respective reception time period elapsed between the reception of the start event by the respective slave converter and the reception of the stop event by the respective slave converter.

14. The method of claim 13, wherein the master POL converter comprises a master oscillator and each of the subset of the plurality of slave POL converters comprises a respective slave oscillator; the method further comprising: the master POL converter successively transmitting a timing result command and data representing the transmission time period; each of the subset of the plurality of slave POL converters receiving the timing result command and the data representing the transmission time period; each of the subset of the plurality of slave POL converters synchronizing its respective slave oscillator to the master oscillator according to its respective reception time period and the transmission time period.

15. The method of claim 9, wherein the bus operation is a write operation comprising the master POL converter transmitting a group exchange command; the method further comprising: a subset of the plurality of slave POL converters receiving the group exchange command; the master POL converter successively transmitting a start event and the first information as part of a read command; the master POL converter writing respective first data to the serial data bus; each of the subset of the plurality of slave POL converters successively writing respective data to the serial data bus in an order determined by respective addresses uniquely identifying each of the subset of the plurality of slave POL converters; and the master POL converter transmitting a stop event.

16. The method of claim 1, wherein the first information that identifies the first POL converter is an address.

17. A power management system comprising: three or more point of load (POL) converters; and a serial data bus coupled to each of the three or more POL converters; wherein each of the three or more POL converters is configured to initiate bus operations over the serial data bus by transmitting its own address onto the bus, and is further configured to transmit information onto the serial data bus, wherein the information has a single origination point and multiple destination points; and wherein at least one of the remaining ones of the three or more POL converters is configured to receive the transmitted own address and the information, and perform at least one function according to the information in response to receiving the own address.

18. The power management system of claim 17, wherein the three or more POL converters include a master POL converter and two or more slave POL converters, wherein the single origination point is the master POL converter and the multiple destination points are the two or more slave POL converters.

19. A power management system comprising: three or more point of load (POL) converters including a first POL converter and remaining POL converters; and a serial data bus coupled to each of the three or more POL converters; wherein the first POL converter is configured to communicate information over the serial data bus to two or more of the remaining POL converters by initiating a bus transfer on the serial data bus by transmitting its own address on the serial data bus; and wherein at least one of the two or more of the remaining POL converters is configured to receive the information and the transmitted own address, and perform at least one function based on the information in response to receiving the transmitted own address.

20. The power management system of claim 19, wherein the two or more of the remaining POL converters are a subset of the remaining POL converters.

21. The power management system of claim 19, wherein the serial data bus operates according to a protocol, wherein the protocol does not specify single transactions having multiple destinations points that are a subset of all devices that are coupled to the serial data bus.

22. A point of load (POL) converter comprising: a serial data bus interface configured to couple to a serial bus; and a first register configured to store a first address that uniquely identifies the POL converter; wherein the POL converter is configured to communicate with other POL converters through the serial data bus interface by initiating a bus operation on the serial data bus by transmitting the first address, and is further configured to transmit data through the serial data bus interface as part of the bus operation; and wherein at least one of the other POL converters is configured to receive the first address and the data, and utilize at least a portion of the data to perform one or more functions in response to receiving the first address and the data.

23. The POL converter of claim 22, wherein a single target address for the bus operation is the first address.

24. The POL converter of claim 22, further comprising: a second register configured as a mask register for the first register, wherein an unmasked segment of bits of the first address defines an address group, wherein the POL converter and at least one of the other POL converters are comprised in the address group.

25. The POL converter of claim 24, wherein a masked segment of bits of the first address identifies the POL regulator within the address group.

26. The POL converter of claim 25, further comprising a first plurality of additional registers, each of the first plurality of registers configured to store a respective address that uniquely identifies the POL converter.

27. The POL converter of claim 26, further comprising a second plurality of registers, each of the second plurality of registers configured as a mask register for a respective one of the first plurality of registers, wherein a respective unmasked segment of bits of each respective address defines an additional respective address group, wherein the POL converter and at least a subset of the other POL converters are comprised in the additional respective address group.

28. The POL converter of claim 27, wherein a masked respective segment of bits of each respective address identifies the POL converter within the additional respective address group.

29. A power management system comprising: a serial data bus; and a plurality of point of load (POL) converters coupled to the serial data bus, wherein each of the plurality of POL converters is uniquely identified by at least one respective address; wherein at least one of the plurality of POL converters is configured to initiate communication over the serial data bus with other ones of the plurality of POL converters by transmitting onto the serial data bus a data packet containing a first address, wherein the first address is the at least one respective address that uniquely identifies the at least one POL converter; and wherein at least one of the other ones of the plurality of POL converters is configured to receive the data packet and identify at least a first portion of the first address, and perform one or more functions according to information contained in the data packet in response to identifying the at least first portion of the first address.

30. The power management system of claim 29, wherein each POL converter of the plurality of POL converters comprises: a first register configured to store the at least one respective address that uniquely identifies the POL converter; and a second register configured to store mask data to mask out a first segment of bits of the at least one respective address, wherein a remaining segment of bits of the at least one respective address identifies a first address group.

31. The power management system of claim 29, wherein each POL converter of the plurality of POL converters is configured to be uniquely identified by at least one additional respective address, wherein the at least one additional respective address is uniquely different from the at least one respective address.

32. The power management system of claim 31, further comprising a local controller coupled to the serial data bus and operable to communicate with the plurality of POL converters.

33. The power management system of claim 32, wherein in communicating with a given POL converter of the plurality of POL converters, the local controller is operable to use the at least one additional respective address that uniquely identifies the given POL converter.

34. The power management system of claim 29, further comprising one or more additional devices coupled to the serial data bus, wherein the one or more additional devices are not POL converters.

35. A point of load (POL) converter comprising:
an interface to a serial data bus; and memory configured to store a first address that uniquely identifies the POL converter; wherein the POL converter is configured to initiate communication over the serial data bus with other POL converters, wherein the POL converter initiates communication with one or more other POL converters by transmitting a first information packet comprising the first address through the serial data bus interface, and wherein the POL converter is further configured to receive other information packets from the other POL converters through the serial data bus interface as part of the communication; and wherein at least one of the other POL converters is configured to receive the information packet comprising the first address, identify the first address, and transmit one or more of the other information packets onto the serial bus, in response to identifying the first address.

36. The POL converter of claim 35, further comprising a voltage converter, wherein the POL converter is configured to provide a regulated output voltage through the voltage converter.

37. The POL converter of claim 35, wherein the information packets comprise power management function tags and/or configuration information.

38. The POL converter of claim 37, wherein the power management functions comprise one or more of: power status reporting; power fail reporting; measured output voltage reporting; measured load current reporting; and fault event reporting.

39. A power management system comprising:
a serial data bus; and a first point of load (POL) converter comprising:
an interface coupled to the serial data bus; and a first register configured to store a first address that uniquely identifies the POL converter; additional POL converters coupled to the serial data bus; wherein the first POL converter is configured to initiate communication over the serial data bus with other POL converters by transmitting the first address through the interface to the serial data bus, wherein the POL converter is configured to transmit the first address by transmitting an information packet comprising the first address; and wherein at least one of the additional POL converters is configured to monitor the serial data bus for the information packet, and perform one or more functions according to information comprised in the information packet, in response to identifying the first address as a result of monitoring the serial data bus for the information packet.

40. The power management system of claim 39, wherein each of the additional POL converters is operable to perform one or more power management functions in response to the initiated communication.

41. The power management system of claim 39, wherein the first POL converter is operable to transmit additional information packets to the serial data bus through the interface, subsequent to said transmitting the information packet.

42. The power management system of claim 41, wherein the additional POL converters are operable to monitor the serial data bus for the additional information packets.

43. The power management system of claim 42, wherein the additional information packets comprise voltage tracking information, wherein each of the additional POL converters is operable to control a respective output voltage according to the voltage tracking information.

44. The power management system of claim 42, wherein the additional information packets comprise a target output voltage value corresponding to the first POL converter, wherein each of the additional POL converters has a corresponding target output voltage value, wherein each of the additional POL converters is operable to determine if its corresponding target output voltage value is larger than or smaller than the target output voltage value corresponding to the first POL converter.

45. The power management system of claim 44, wherein the first POL converter and the additional POL converters are configured to turn on in a prescribed order according to their corresponding target output voltage values.

46. The power management system of claim 42, wherein the additional information packets comprise one or more of: phase spreading data; fault recovery data; clock synchronization data; temperature data; and phase locking data.

47. A point of load (POL) converter comprising: a serial data bus interface configured to couple to a serial data bus; wherein the POL converter is configured to communicate with other POL converters through the serial data bus interface by initiating a bus operation on the serial data bus by transmitting a first identifier, wherein the first identifier uniquely identifies the POL converter as a source of the bus operation, wherein the first identifier also specifies two or more of the other POL converters as targets of the bus operation.

48. The POL converter of claim 47, wherein a first portion of the first identifier identifies a first group, wherein the POL converter and the two or more of the other POL converters are included in the first group.

49. The POL converter of claim 48, wherein a second portion of the first identifier identifies the POL converter within the first group.

50. The POL converter of claim 48, wherein the first group is defined by a plurality of values, wherein the POL converter and the two or more of the other POL converters are each uniquely identified by a respective one of the plurality of values.

51. The POL converter of claim 50, wherein the plurality of values form an address range, wherein each one of the plurality of values is an address.

52. The POL converter of claim 47, wherein the POL converter is uniquely identified by a plurality of distinct identifiers that includes the first identifier.

53. The POL converter of claim 52, wherein a respective first portion of each of the plurality of distinct identifiers identifies a respective one of a plurality of groups, wherein the POL converter is included in the identified ones of the plurality of groups.

54. The POL converter of claim 53, wherein each of the two or more of the other POL converters is included in one or more of the identified ones of the plurality of groups.

55. The POL converter of claim 53, wherein a respective second portion of each one of the plurality of distinct identifiers identifies the POL converter within the respective one of the plurality of groups identified by the respective first portion of the one of the plurality of distinct identifiers.

56. The POL converter of claim 47, wherein the first identification information is a first address, wherein the POL converter further comprises first memory configured to store the first address.

57. The POL converter of claim 56, wherein a first portion of the first address identifies a first group, wherein the POL converter and the two or more of the other POL converters are included in the first group.

58. The POL converter of claim 57, wherein a remaining portion of the first address identifies the POL converter within the first group.

59. The POL converter of claim 58 further comprising second memory configured to store masking information corresponding to the first address, wherein the masking information masks the remaining portion of the first address.

* * * * *